US 6,685,005 B2

(12) United States Patent
Youn

(10) Patent No.: US 6,685,005 B2
(45) Date of Patent: Feb. 3, 2004

(54) SKEWED-ROLLER BELT DRIVE FOR BELT-DRIVEN ROLLER CONVEYOR

(75) Inventor: Steven Theodore Youn, Wyoming, MI (US)

(73) Assignee: Ermanco Incorporated, Spring Lake, MI (US)

( * ) Notice: Subject to any disclaimer, the term of this patent is extended or adjusted under 35 U.S.C. 154(b) by 0 days.

(21) Appl. No.: 10/214,404

(22) Filed: Aug. 6, 2002

(65) Prior Publication Data
US 2003/0047423 A1 Mar. 13, 2003

Related U.S. Application Data

(60) Provisional application No. 60/311,654, filed on Aug. 10, 2001.

(51) Int. Cl.[7] .............................................. B65G 47/26
(52) U.S. Cl. ........................ 198/456; 198/787; 198/790
(58) Field of Search .............................. 198/456, 782, 198/781.03, 786, 787, 790

(56) References Cited

U.S. PATENT DOCUMENTS

| 4,264,002 | A |   | 4/1981  | Van Der Schie      |
| 4,372,442 | A |   | 2/1983  | Fleischauer        |
| 4,473,148 | A | * | 9/1984  | Saur ........................ 198/790 |
| 4,730,718 | A |   | 3/1988  | Fazio et al.       |
| 4,819,788 | A |   | 4/1989  | Van Der Schie      |
| 4,887,707 | A |   | 12/1989 | Harms              |
| 4,962,841 | A |   | 10/1990 | Kloosterhouse      |
| 5,007,526 | A |   | 4/1991  | Fazzina et al.     |
| 5,042,644 | A |   | 8/1991  | Davis              |
| 5,048,661 | A |   | 9/1991  | Toye               |
| 6,035,998 | A |   | 3/2000  | Garzelloni         |
| 6,161,681 | A |   | 12/2000 | Kalm               |
| 6,253,905 | B1 | * | 7/2001  | Pelka ........................ 198/456 |
| 6,390,286 | B1 | * | 5/2002  | Nguyen et al. ........ 198/781.03 |

* cited by examiner

Primary Examiner—Joseph E. Valenza
(74) Attorney, Agent, or Firm—Cook, Alex, McFarron, Manzo, Cummings & Mehler, Ltd.

(57) ABSTRACT

A belt guide for a drive belt of a roller conveyor that cants the belt in the skewed roller section of the conveyor so that an edge portion of the belt, and not the entire width, engages the skewed rollers to impart driving motion. This is accomplished by providing a series of free-wheeling cam followers that support the raised edge portion of the drive belt that contacts the skewed rollers. A second series of freely rotatable grooved wheels or sheaves is provided whose grooved portion captures the lower edge portion of the drive belt.

6 Claims, 4 Drawing Sheets

SKEWED-ROLLER BELT DRIVE FOR BELT-DRIVEN ROLLER CONVEYOR

CROSS-REFERENCE TO RELATED APPLICATION

This application claims the benefit of U.S. provisional application Ser. No. 60/311,654, filed Aug. 10, 2001.

BACKGROUND OF THE INVENTION

Roller conveyors are well-known in the art, as exemplified by U.S. Pat. Nos. 4,819,788 and 5,042,644, both of which are assigned to Ermanco Incorporated, the assignee of the present application. In roller conveyors, skewed roller sections (i.e., sections where the rollers are at an oblique angle with respect to the conveyor frame) are used along straight runs to urge the articles being transported on the conveyor to one side of the conveyor or the other, depending on the direction in which the rollers are skewed.

In a belt-driven roller conveyor, a single elongated flat belt frictionally engages the bottoms of the rollers to drive or rotate the rollers along a straight run. An exemplary belt-driven roller conveyor is the AccuROL® conveyor of Ermanco Incorporated.

FIG. 1 is a fragmentary perspective view of a portion of the straight section of an AccuROL® conveyor system, generally designated 10. The system includes a pair of parallel frame members 12 that support a plurality of rollers 14 which are driven from underneath by frictional engagement with a belt 16. As illustrated, in the straight section, the underside of the belt 16 is supported by a series of guide rollers 18 spaced along the length of the system 10. The belt is on the order of 4 inches in width and is supported on the guide rollers 18 so as to run parallel to the conveyor frame. The bottom of the belt 16 includes a V-guide 16a that is received in a circumferential groove 18a in the guide roller 18. The upper surface of the drive belt 16 is substantially parallel to a plane defined by the axes of the rollers 14, so that substantially the entire width of the belt 16 engages the rollers 14 in order to drive them.

When such a belt-drive encounters a skewed roller section, the forces exerted on the belt tend to cause it to run perpendicular to the axes of the rollers, and thus run off its guide rollers. If the belt has a V-guide integral with its underside for mating with a groove in the guide rollers, the side forces encountered by the belt in the skewed roller section may cause premature wear and separation of the belt.

Accordingly, it is the principal object of the present invention to provide an improved belt guide for the skewed roller section of a belt-driven roller conveyor.

SUMMARY OF THE INVENTION

This object, as well as others that will become apparent upon reference to the following description and attached drawings are provided by a belt guide which cants the belt in the skewed roller section of the conveyor so that an edge portion of the belt, and not the entire width, engages the skewed rollers to impart driving motion. This is accomplished by providing a series of free-wheeling "cam followers" that support the raised edge portion of the drive belt that contacts the skewed rollers. A second series of freely rotatable grooved wheels or sheaves is provided whose grooved portion captures the lower edge portion of the drive belt.

DESCRIPTION OF THE PREFERRED EMBODIMENT

Figure 1:
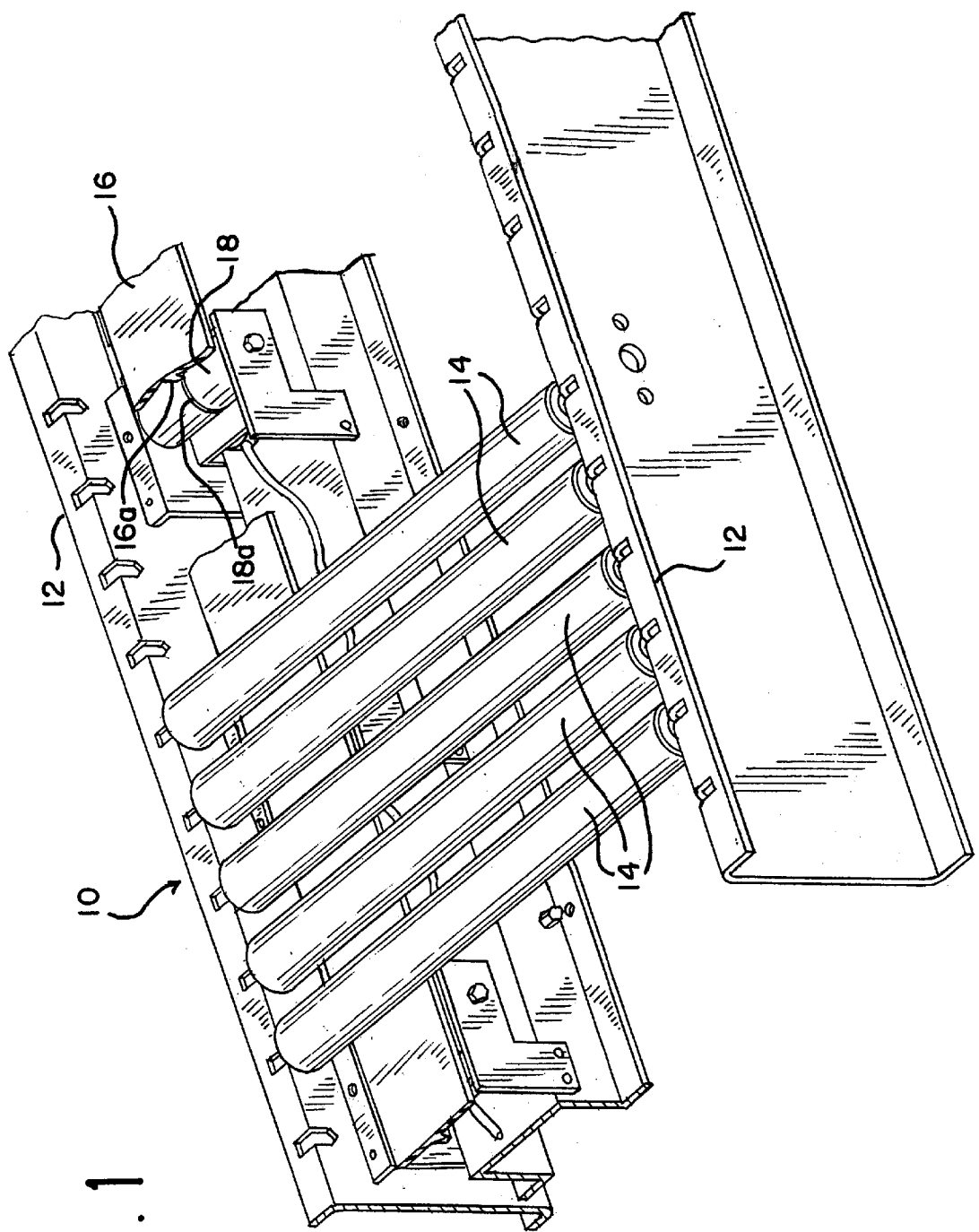
FIG. 1 is a fragmentary perspective view of a straight section of a belt-driven roller conveyor.
Figure 2A:
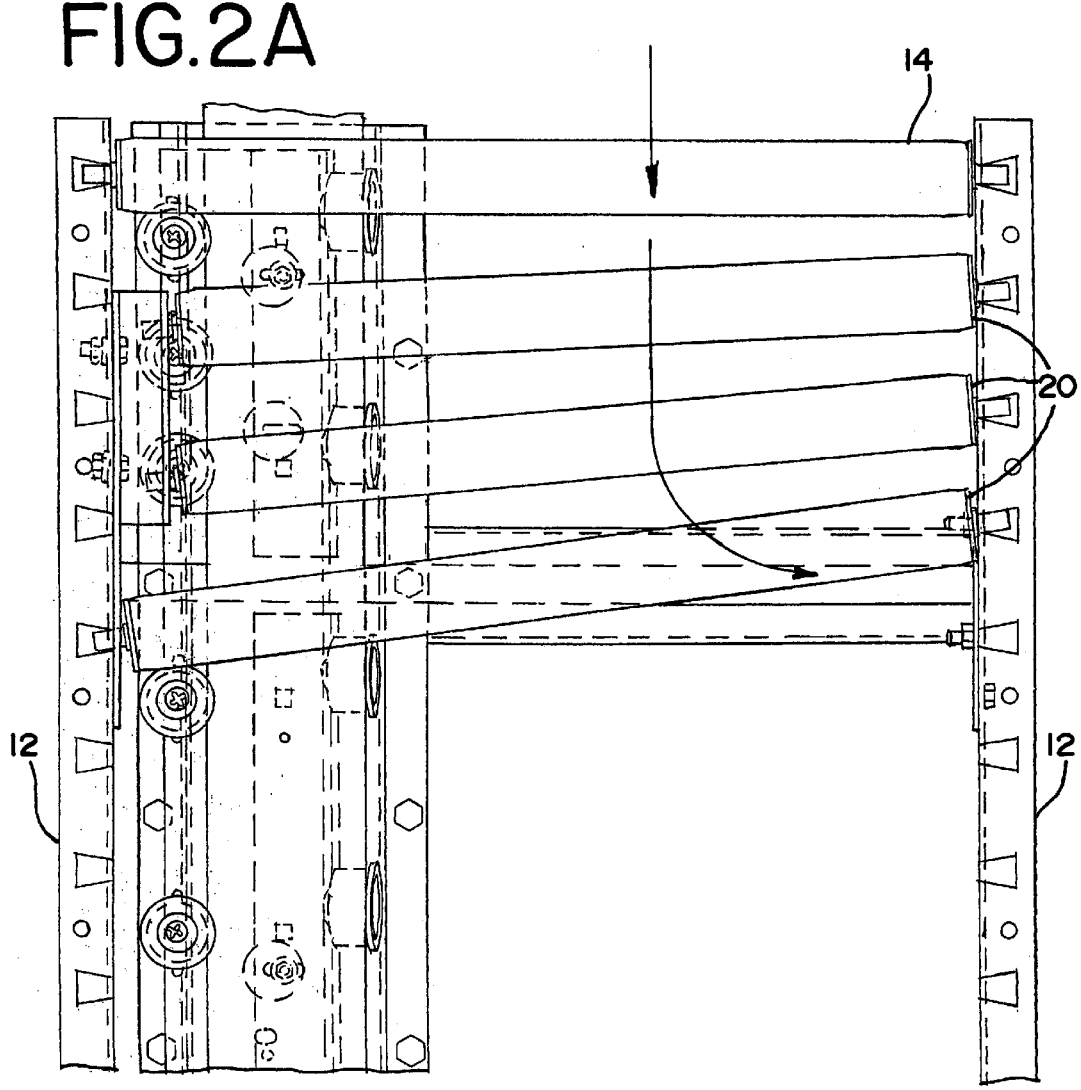
FIG. 2A is a fragmentary top view of a skewed roller section of a belt-driven roller conveyor embodying the present invention in which objects carried on the conveyor are moved to the right-hand side of the conveyor.
Figure 2B:
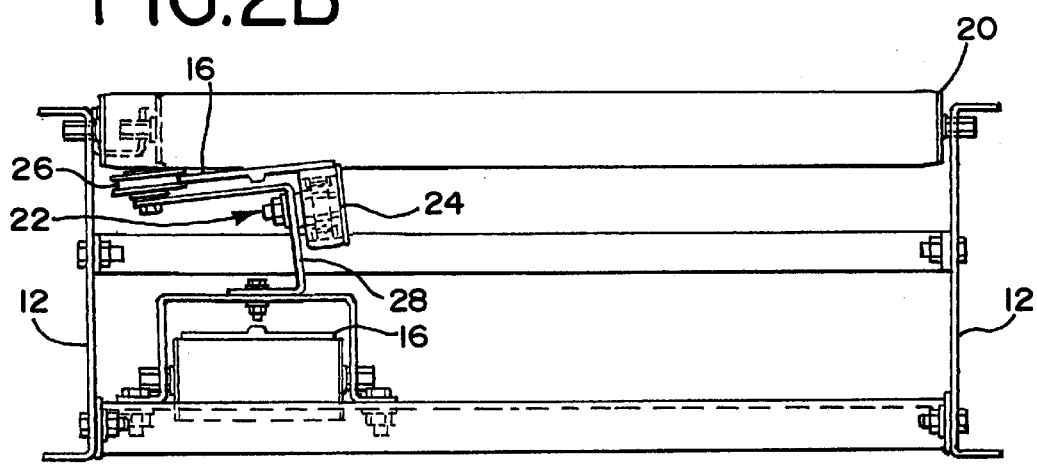
FIG. 2B is an end view of the roller conveyor of FIG. 2A.

With reference to FIGS. 2A and 2B there is seen a top view and end view respectively of a skewed roller section embodying the present invention. The skewed rollers 20 are received in the frame members 12 so as to be at an oblique angle thereto. In FIG. 2A, the skewed rollers cause an object being transported thereon to be moved to the right-hand side of the conveyor.

With reference to FIG. 2B, a cross-sectional view of the belt guide of the present invention is shown. The belt guide, generally indicated by 22, supports the upper run of the belt 16 at a slight angle with respect to the axes of the skewed roller. The angle between the surface of the belt and the axes of rotation of the skewed rollers is dependent upon the length of the rollers, with the longer the rollers, the shallower the angle. The angle may be as great as 30 degrees, but is generally between 5 and 10 degrees, and preferably is approximately 7 degrees. The belt 16 is supported on its raised edge portion by a series of flat sheaves 24 (one of which is seen in FIG. 2B). The lower edge of the belt 16 is captured by a series of grooved sheaves 26 (one of which is shown in FIG. 2B). Both the flat sheaves 24 and the grooved sheaves 26 are supported for freely rotatable motion on a generally U-shaped elongated bracket 28. The flat sheaves 24 are the "pressure wheels" that force the edge of the drive belt 16 into engagement with the rollers 20, and thus rotate the rollers.

Figure 3A:
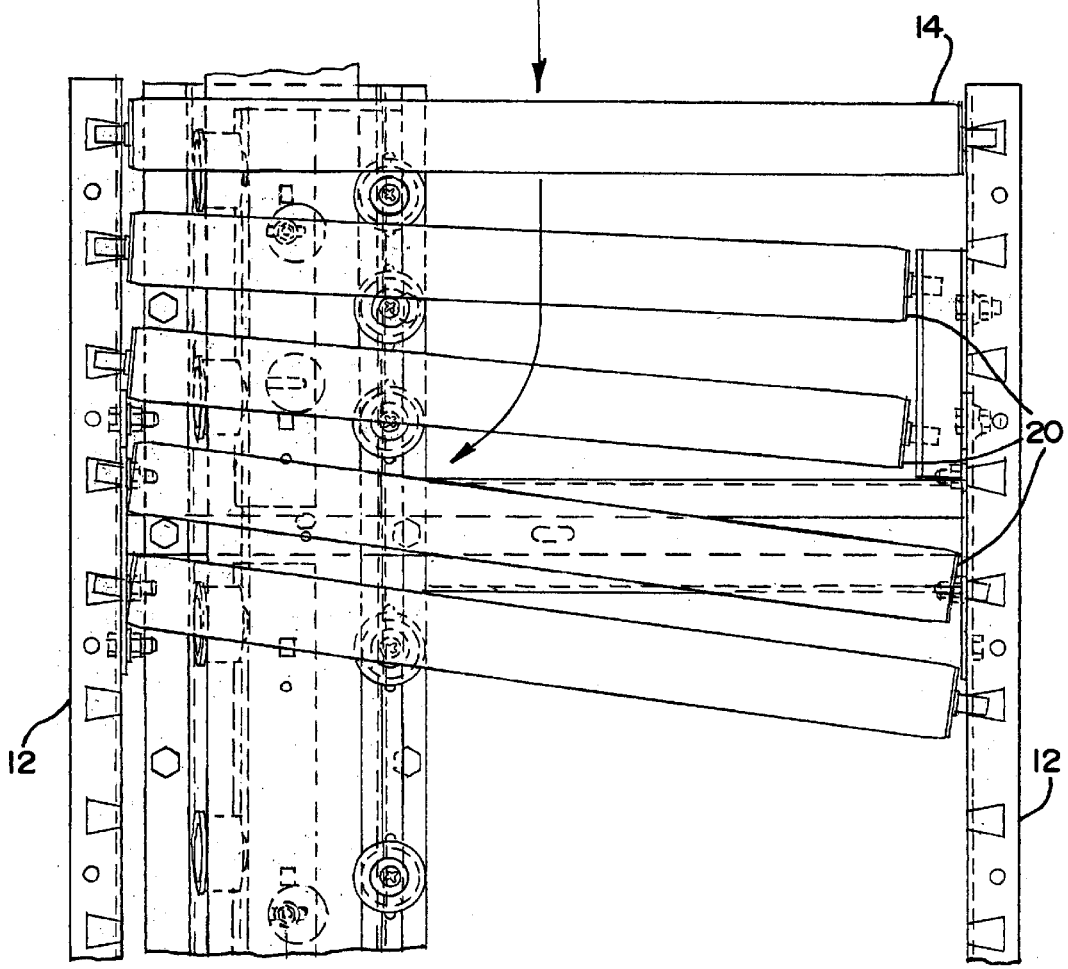
FIG. 3A is a fragmentary top view of a skewed roller section of a belt-driven roller conveyor embodying the present invention in which objects carried on the conveyor are moved to the left-hand side of the conveyor.
Figure 3B:
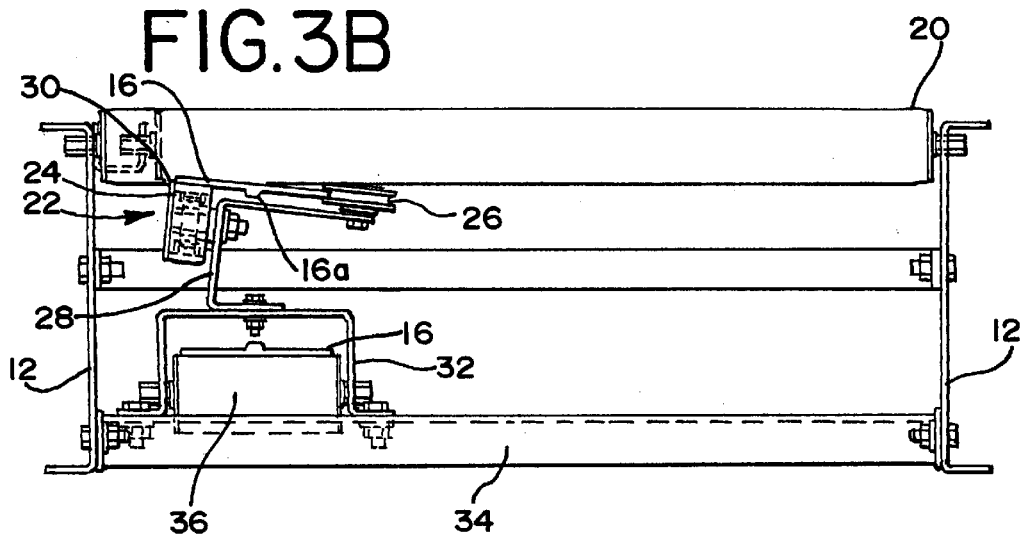
FIG. 3B is an end view of the roller conveyor of FIG. 3A.

FIGS. 3A and 3B are similar to FIGS. 2A and 2B, except that the rollers 20 are skewed in the opposite direction so that an object carried by the conveyor is moved to the left-hand side of the conveyor. This requires the drive belt 16 to be canted in the opposite direction to that in FIG. 2B, so that the edge of the drive belt closest to the frame is the portion that engages the skewed rollers.

The flat sheave 24 includes a flange 30 that provides a raised outer edge that, in conjunction with the grooved sheave 26, serves to limit any side-to-side or lateral motion of the belt 16. The U-shaped bracket 28 is supported on a second, generally U-shaped bracket 32 that is bolted to a cross-frame member 34 extending between the frame members 12. The U-shaped bracket 32 also carries a guide roller 36 that supports the lower or return run of drive belt 16.

The V-guide 16a of the belt 16 is not in any track while the belt 16 is in the skewed roller section of the conveyor. This essentially eliminates any side forces on the V-guide, thus promoting longer service time for the belt.

Figure 4:
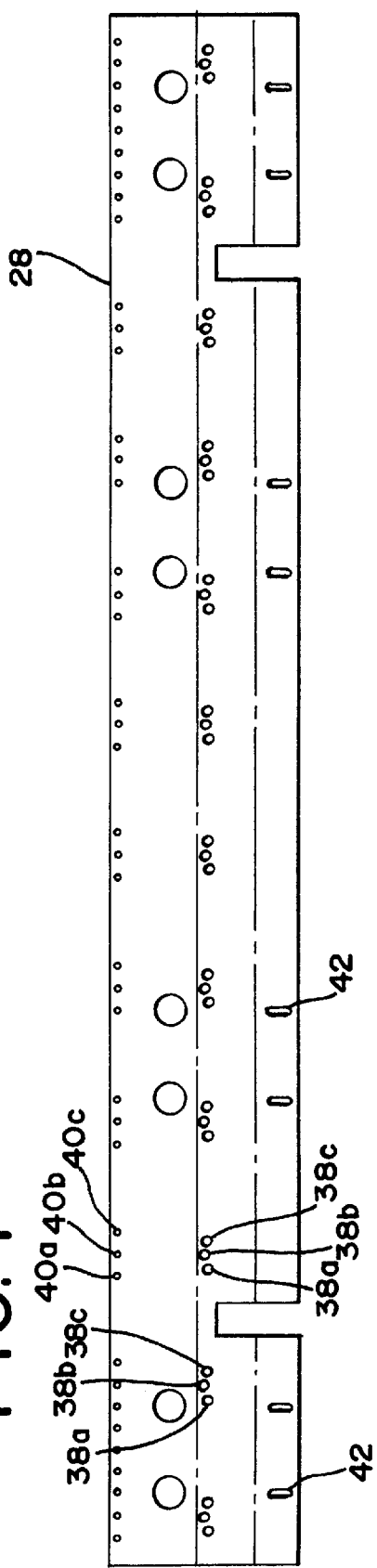
FIG. 4 is a plan view of a support bracket, prior to folding, forming a part of the present invention.
Figure 5B:
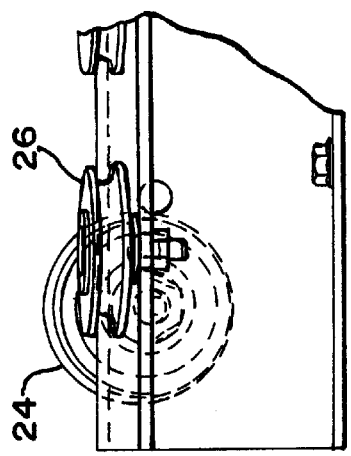
FIGS. 5A and 5B are enlarged side views taken from opposite sides of the bracket of FIG. 4 after folding, enlarged to show detail.
Figure 5A:
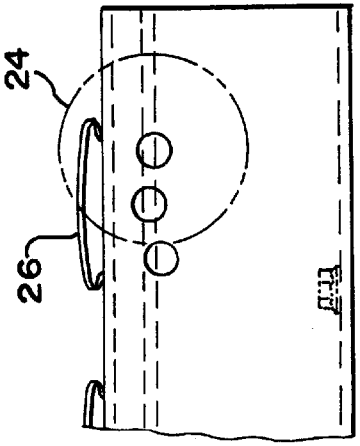

FIG. 4 is a plan view of a blank piece of sheet material, prior to folding, from which the U-shaped bracket 28 is made. The bracket 28 includes a series of holes 38a, b, c, for mounting each flat sheave 24. Depending on the hole on which the sheave 24 is mounted, the amount of engagement between the belt 16 and the rollers 14, and thus the drive force exerted by the belt on the rollers, can be varied: the greater the amount of engagement, the greater the drive force. As best seen in FIGS. 5A and 5B, the three holes enable the height of the cam follower to be varied by as much as one-eighth inch, in one-sixteenth inch increments. A corresponding mounting hole 40a, b, c is provided for each sheave 24.

The bracket 28 is also formed with a series of elongated slots 42 which receive a bolt that secures the bracket 28 to the bracket 32. The slot allows for minor adjustment of the lateral position of the bracket 28, and thus the location along the length of the roller 14 where the belt 16 engages the roller.

The number of rollers and sheaves, as well as the dimensions of the different components, may be varied without departing from the scope of the invention. Also, while the belt guide is shown in conjunction with a belt having a V-guide, the belt guide works equally well with a flat belt.

What is claimed:

1. In a belt-driven roller conveyor having parallel frame members, a plurality of conveyor rollers having axes of rotation and being mounted obliquely with respect to the frame members, and a belt having a surface with a width defined by first and second edges, the belt frictionally engaging the conveyor rollers to impart rotation to the conveyor rollers about their axes, a belt guide comprising:

a first series of at least one guide roller adapted to engage the first edge of the belt;

a second series of at least one guide roller adapted to engage the second edge of the belt;

whereby the first and second series of guide rollers support the belt so that only the surface of the belt adjacent one of the first or second edges thereof engages the obliquely mounted conveyor rollers to impart rotational movement thereto.

2. The belt guide of claim 1 wherein the rollers in each of the first series of guide rollers and the second series of guide rollers have axes of rotation, the guide rollers being mounted to a bracket so that the axes of rotation of the rollers of the first series of guide rollers are generally perpendicular with respect to the axes of rotation of the second series of guide rollers.

3. The belt guide of claim 2 wherein the bracket includes a series of mounting holes for each of the rollers in the first series of guide rollers to permit adjustment of the angle between the surface of the belt and the axes of the obliquely-mounted conveyor rollers by selection of the mounting hole for the rollers in the first series of guide rollers.

4. The belt guide of claim 1 wherein the first and second series of guide rollers support the belt so that the surface of the belt is at an oblique angle with respect to the axes of rotation of the obliquely-mounted conveyor rollers.

5. The belt guide of claim 4 in which the angle between the surface of the belt and the axes of rotation of the obliquely-mounted conveyor rollers is less than or equal to 30°.

6. The belt guide of claim 4 in which the angle between the surface of the belt and the axes of rotation of the obliquely-mounted conveyor rollers is from approximately 5° to 10°.

* * * * *